United States Patent

Saka et al.

[11] Patent Number: 5,652,026
[45] Date of Patent: Jul. 29, 1997

[54] MODIFICATION OF WOOD

[75] Inventors: Shiro Saka, Ohtsu; Hisashi Miyafuji; Fumie Tanno, both of Kyoto; Akira Yamamoto, Usui-gun; Masaki Tanaka, Chiyoda-ku; Kenji Yamamoto, Usui-gun, all of Japan

[73] Assignee: Shin-Etsu Chemical Co., Ltd., Tokyo, Japan

[21] Appl. No.: 653,026

[22] Filed: May 24, 1996

[30] Foreign Application Priority Data

May 25, 1995 [JP] Japan .................. 7-150821

[51] Int. Cl.⁶ .................................................. B05D 7/06
[52] U.S. Cl. ...................... 427/387; 427/393; 427/393.3; 427/397
[58] Field of Search ............................. 427/387, 393, 427/393.3, 397

[56] References Cited

U.S. PATENT DOCUMENTS

| | | | |
|---|---|---|---|
| 4,784,918 | 11/1988 | Klett | 428/447 |
| 5,120,581 | 6/1992 | Brunken et al. | 427/387 |

FOREIGN PATENT DOCUMENTS 4142901  5/1992  Japan .

OTHER PUBLICATIONS

Abstract of JP 45-007253, Mar. 1970.
Abstract of JP 04-142901, May 1992.

*Primary Examiner*—Shrive Beck
*Assistant Examiner*—Erma Cameron
*Attorney, Agent, or Firm*—Millen, White, Zelano & Branigan, P.C.

[57] ABSTRACT

Wood is modified by impregnating wood with a methylsiloxane oligomer and heating the impregnated wood to cure the oligomer. The oligomer is of the average compositional formula: $(CH_3SiO_{3/2})_m(MO_{3/2})_n$ or $[CH_3SiO_{3/2}]_x[(CH_3)_aSiO_{(4-a)/2}]_y[MO_{3/2}]_z$ wherein M is P, PO and/or B, m and n are positive numbers with an average ratio of m:n ranging from 99:1 to 50:50, x, y, and z are positive numbers with an average ratio of (x+y):z ranging from 99:1 to 50:50 and an average ratio of x:y ranging from 99:1 to 50:50, and a is 2 or 3, and has a hydroxyl group and/or an alkoxyl group at a terminal end. This treatment of wood is safe. Since the methylsilicone resins thus incorporated and fixed within wood are not leached out in water, the modified wood maintains flame retardance for a very long time upon exposure to rain and dew and has water repellence, decay resistance and dimensional stability.

7 Claims, No Drawings

MODIFICATION OF WOOD

BACKGROUND OF THE INVENTION

1. Field of the Invention

This invention relates to a method for producing flame retardant wood, and more particularly, to a method for producing modified wood which is rendered flame retardant for a very long time by forming a metal oxide in the wood and preventing the metal oxide from being leached out in water.

2. Prior Art

Wood has characteristic features of "burning," "decay" and "dimensional instability." Utilization of wood is often restrained by these features when they are regarded drawbacks in a certain application. For example, according to the Japanese building regulation amended June, 1990, wood may be used in open areas insofar as it satisfies a fire penetration resistance/flame shielding time of 60 minutes and 20 minutes for Types A and B, respectively. Wood as such does not clear this standard.

Wood engineers strove to overcome these drawbacks of wood. We found that wood can be modified so as to exhibit satisfactory flame retardance, decay resistance, and dimensional stability by impregnating wood with a silicon alkoxide and forming and fixing silicon oxide in wood cell voids, preferably in voids of wood cell walls, through hydrolysis and polycondensation (see Journal of Japan Wood Research Society, 38 (11), 1043, 1992). This technique is based on a sol-gel method using metal alkoxides. A starting solution of metal alkoxide, water, alcohol and catalyst converts into a sol of metal oxide through hydrolysis and self-polycondensation of the metal alkoxide. As reaction proceeds further, the solution becomes a gel. If this reaction takes place in wood cells, metal oxides formed therein convert wood into wood-inorganic composites.

The recent research revealed that the process of forming wood-metal oxide composites largely depends on the rate of hydrolysis of the metal alkoxide used and subsequent self-polycondensation and that the distribution of metal oxide within wood cells largely varies with preparation conditions. Consideration is now made of the conversion of wood into inorganic composites using a silicon alkoxide having a low rate of hydrolysis. When a moisture-conditioned wood piece (all water in wood exists solely in cell walls as bound water) is used, hydrolysis and poly-condensation of silicon alkoxide takes place only within cell walls where bound water exists, resulting in a wood-inorganic composite wherein cell cavities are void. This wood composite maintains the characteristics of wood which are lightweight, strong, and heat insulating. The modified wood is given dimensional stability, flame retardance and decay resistance while maintaining the porous feature of wood (see Journal of Japan Wood Research Society, 39 (3), 301, 1993). When a water-saturated wood piece (wood is full of water not only within cell walls, but also in cell cavities) is used, however, obtained is a wood-inorganic composite wherein metal oxide fills not only within cell walls, but also in cavities (see Journal of Japan Wood Research Society, 39 (3), 301, 1993).

However, if the metal alkoxide used is changed, obtained is a wood-inorganic composite having a completely different distribution of metal oxide. When a titanium alkoxide having a high rate of hydrolysis is used for a moisture-conditioned wood piece, titanium oxide is formed only within cell cavities. In the case of a water-saturated wood piece, titanium oxide is formed only on the outer surface of wood and no composite with metal oxide is formed within the wood piece (see Journal of Japan Wood Research Society, 39 (3), 308, 1993).

The relationship of the distribution of metal oxide in cells to the imparted function is examined on the basis of these findings. It was found that if a metal oxide composite is selectively formed within cell walls, various functions are effectively exerted by forming only small amounts of metal oxides. Such wood composites have incorporated therein inorganic substances, typically metal oxides resulting from silicon alkoxides, boron alkoxides and phosphorus alkoxides. When treatment is done at temperatures at which wood is not pyrolyzed, the latter two alkoxides form unstable metal oxides which are easily leached out in water.

Additionally, the above-mentioned metal alkoxides must be carefully handled on actual use since they have a high vapor pressure and toxicity.

SUMMARY OF THE INVENTION

An object of the invention is to provide a method for producing modified wood which prevents metal oxide from being leached out in water and exhibits stable flame retardance over a long period of time.

According to the invention, wood is modified by impregnating it with a solution of a methylsiloxane oligomer containing phosphorus and/or boron. In one form, the oligomer is a methylsiloxane oligomer containing phosphorus and/or boron and having a hydroxyl group and/or an alkoxyl group of 1 to 4 carbon atoms at a terminal end which is represented by the following average compositional formula (i):

(1) $(CH_3SiO_{3/2})_m(MO_{3/2})_n$

wherein M is at least one of P, PO and B, letters m and n are positive numbers provided that m+n=1, and an average ratio of m:n is from 99:1 to 50:50. Alternatively, the oligomer is a methylsiloxane oligomer containing phosphorus and/or boron and a siloxane unit having at least two methyl groups directly attached to a silicon atom as represented by $(CH_3)_aSiO_{(4-a)/2}$ wherein a is equal to 2 or 3. More specifically, it is a methylsiloxane oligomer containing phosphorus and/or boron and having a hydroxyl group and/or an alkoxyl group of 1 to 4 carbon atoms at a terminal end which is represented by the following average compositional formula (2):

(2) $[CH_3SiO_{3/2}]_x[(CH_3)_aSiO_{(4-a)/2}]_y[MO_{3/2}]_z$

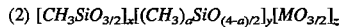

wherein M is at least one of P, PO and B, letters x, y, and z are positive numbers provided that x+y+z=1, an average ratio of (x+y):z is from 99:1 to 50:50, an average ratio of x:y is from 99:1 to 50:50, and a is equal to 2 or 3. After impregnation, the oligomer is subject to hydrolysis and further polycondensation resulting in curing. As a result, a methyl-silicone resin containing incombustible phosphorus oxide and/or boron oxide is formed in cell walls, resulting in modified wood which is rendered water repellent, prevents the phosphorus oxide and/or boron oxide from being leached out in the presence of water, and can maintain flame retardance for a very long time. Especially the latter methylsiloxane oligomer containing a silicon atom having at least two methyl groups directly attached thereto is stable enough during wood treatment and shelf storage.

Therefore the present invention provides a method for preparing modified wood comprising the steps of impregnating wood with a methylsiloxane oligomer of formula (1) or (2) and curing the oligomer.

Flame retardance is maintained because the water repellence that the methylsilicone resin possesses prevents the phosphorus oxide and boron oxide from being leached out in water. Since wood is treated with the oligomer of formula (1), the method of the invention is a fully safe and practical wood modification method.

Particularly when a methylsiloxane oligomer containing phosphorus and/or boron and a silicon atom having at least two methyl groups directly attached thereto as represented by formula (2) is impregnated in wood and cured therein, the phosphorus oxide and/or boron oxide which is leachable can be chemically bound in a water repellent methylsilicone resin and a cured product or gel thereof, preventing the phosphorus oxide and/or boron oxide from being leached out in water. It is then possible to impart for a very long time stable flame retardance to wood. This methylsiloxane oligomer is unlikely to thicken or gel during wood treatment and stable during shelf storage, ensuring efficient production of modified wood.

In this way, the modifying method of the invention ensures simple manufacture of flame retardant wood members without detracting from the texture and feel inherent to wood, so that the flame retardant wood members can be used in open areas even under the strict building regulation and as building interior and exterior members. Especially by impregnating wood with a methylsiloxane oligomer containing phosphorus and/or boron and a silicon atom having at least two methyl groups directly attached thereto, subjecting the oligomer within wood cell voids to hydrolysis or pyrolysis and effecting polycondensation, there is formed a phosphorus oxide and/or boron oxide which is chemically bound in a water repellent methylsilicone resin and a cured product or gel thereof. This process prevents the phosphorus oxide and/or boron oxide from being leached out in water and imparts for a very long time stable flame retardance to wood.

The method according to the invention, which requires only treatment of wood with methylsiloxane oligomers of formulae (1) and (2), affords a commercially acceptable wood modifying technique which is efficient and safe in operation.

DETAILED DESCRIPTION OF THE INVENTION

The starting wood used herein is not critical. For example, logs, sawed lumbers, sliced veneers, and plywood boards are included while any kind of tree may be used.

The invention uses a methylsiloxane oligomer which contains phosphorus and/or boron and has the following average compositional formula (1) or (2).

(1) $(CH_3SiO_{3/2})_m(MO_{3/2})_n$

In formula (1), M is at least one of P, PO and B. Letters m and n are positive numbers provided that m+n=1. The average molar ratio of m:n is from 99:1 to 50:50, preferably from 95:5 to 70:30. If the molar fraction m is less than 50 in ratio, the resulting methylsilicone resin is less water repellent and less resistant to leaching.

(2) $[CH_3SiO_{3/2}]_x[(CH_3)_aSiO_{(4-a)/2}]_y[MO_{3/2}]_z$

In formula (2), M is as defined above, letters x, y, and z are positive numbers provided that x+y+z=1. The average molar ratio of (x+y):z is from 99:1 to 50:50, preferably from 95:5 to 70:30. If the molar fraction (x+y) is less than 50 mol, the resulting methylsilicone resin is less water repellent and less resistant to leaching. The average molar ratio of x:y is from 99:1 to 50:50. If the molar fraction x is less than 50 in ratio, the resulting methylsilicone resin would have a low crosslinking density. If the molar fraction y is less than 1 mol, the resulting methylsilicone would have a low methyl content. In either case, water repellence and leach-inhibitory effect are insufficient. Also with a molar fraction y of less than 1, the oligomer would have too high hydrolysis reactivity, detracting from wood treatment feasibility and shelf stability. Letter a is equal to 2 or 3.

Whether it is of formula (1) or (2), the oligomer is terminated with a hydroxyl group and/or an alkoxyl group of 1 to 4 carbon atoms. Alkoxyl groups of more than 4 carbon atoms are undesirable because hydrolysis reaction is retarded to lower the productivity of wood treatment. Useful alkoxyl groups are methoxyl, ethoxyl, propoxyl and butoxyl groups with the commercially advantageous methoxyl group being preferred.

Preferably the methylsiloxane oligomer has an average degree of polymerization of 2 to 50, preferably 2 to 20. Oligomers with an average degree of polymerization of less than 2 would have a higher vapor pressure and give rise to a hazard problem whereas oligomers with an average degree of polymerization of more than 50 would require a long time to impregnate wood therewith and would also result in a difficulty in impregnating into the cavities in the wood cell walls.

The phosphorus and/or boron-containing methylsiloxane oligomer of formula (1) can be prepared by a conventional process of subjecting to co-hydrolysis a methyltrialkoxylsilane or a partial hydrolyzate thereof and at least one compound selected from the group consisting of phosphoric acid, phosphorous acid, trialkyl phosphites, boric acid, and trialkyl borates.

The phosphorus and/or boron-containing methylsiloxane oligomer of formula (2) can be prepared by a conventional process of subjecting to co-hydrolysis and condensation a methyltrialkoxylsilane, dimethyldialkoxylsilane, trimethylalkoxylsilane or a partially hydrolyzed condensate thereof and at least one compound selected from the group consisting of phosphoric acid, phosphorous acid, trialkyl phosphites, boric acid, and trialkyl borates.

In the step of impregnating the methylsiloxane oligomer into wood cell walls, the oligomer may be used as such. Often, the methylsiloxane oligomer is diluted with suitable solvents, for example, alcohols such as methyl alcohol and ethyl alcohol, ketones such as acetone and methyl isobutyl ketone to form an impregnating solution.

The methylsiloxane oligomer may be mixed with a precursor of another metal oxide for further enhancing the flame retardant effect of wood. Exemplary precursors include tetramethoxylsilane, tetraethoxylsilane, methylpolysilicate and ethylpolysilicate. Any of these precursors may be added to a methyltrialkoxylsilane or a partial hydrolyzate thereof and subject to co-hydrolysis while producing the methylsiloxane oligomer. For imparting more water repellence, a long-chain alkyltrialkoxylsilane or perfluoroalkyltrialkoxylsilane may also be added by merely mixing or by mixing and subjecting to co-hydrolysis.

Upon impregnation with the methylsiloxane oligomer, wood may be either moisture-conditioned or fully water-saturated. Typically wood is previously conditioned to a water content of 10 to 50% by weight and then dipped in the methylsiloxane oligomer or a solution thereof. Instead of dipping, vacuum or pressure penetration may be used to effect impregnation.

Next, the wood impregnated with the methylsiloxane oligomer and aged is dried at a temperature at which the wood does not undergo pyrolysis, preferably 50° to 110° C. In the drying step, the oligomer cures through hydrolysis or pyrolysis and subsequent polycondensation, converting into a methylsilicone resin containing phosphorus oxide and/or boron oxide. The hydrolysis step may be promoted by an acidic or basic catalyst, metal organic acid salt or organometallic compound or a mixture of such catalysts. Typically, wood is impregnated with a methylsiloxane oligomer solution, kept therein for about 1 to 7 days under a vacuum of 10 to 15 mm Hg at room temperature, taken out of the solution, allowed to stand at room temperature for about one day, and heat dried at 50° to 110° C. for about ½ to 2 days.

EXAMPLE

Examples of the present invention are given below by way of illustration and not by way of limitation.

EXAMPLE 1

A 1-liter flask was charged with 123 grams (0.9 mol) of methyltrimethoxylsilane and 3.1 grams (0.05 mol) of boric acid. With stirring at 30° C., 16 grams of a 30% phosphoric acid aqueously solution (0.05 mol of phosphoric acid) was added dropwise to the flask for reaction to take place. The reaction solution was ripened for one hour at 60° C., obtaining a 65% methanol solution of an oligomer. The solution was diluted with methanol to form a 10% methanol solution of the oligomer. This oligomer had an average compositional formula:

$$(CH_3SiO_{3/2})_{0.9}(OPO_{3/2})_{0.05}(BO_{3/2})_{0.05}$$

and an average degree of polymerization of about 4 and was terminated with a methoxyl group and a hydroxyl group.

Separately, a veneer piece of western hemlock [Tsuga heterophylla sarg.] sap wood (50 mm×100 mm×1 mm) was conditioned to a moisture content of 25% by Soxhlet extraction with acetone for 24 hours and then with water for 24 hours. The veneer piece was dipped in the methanol solution of the oligomer under vacuum at room temperature for 3 days. Thereafter, the veneer piece was heat treated for 24 hours at 65° C. and then for 24 hours at 105° C.for curing the oligomer, obtaining a modified wood piece. The modified wood piece had a weight gain of 11.3% due to the incorporation of a silicone resin containing phosphorus and boron oxides.

A 300-ml beaker was charged with 250 ml of distilled water. While stirring water at 160±3 rpm, the modified wood piece was admitted into the beaker. Stirring was continued for 4 hours. The modified wood piece was examined for weight change, finding that 7.5% by weight of the silicone resin was leached out. The piece was tested by thermogravimetric analysis to find a residual weight after flaming combustion of 65%. Another modified wood piece which had not been subject to the leaching test had a residual weight of 66%. An untreated wood piece (control) had a residual weight of 27%.

The physical properties of modified wood were measured by the following tests.

(1) Weight gain (WPG)

A veneer piece which was conditioned by Soxhlet extraction with acetone for 24 hours and then with water for 24 hours was measured for oven dry weight (Wu). After the veneer piece was modified to form a wood-inorganic composite, it was dried at 105° C. for 24 hours and measured for oven dry weight (Wt). A weight gain (WPG) of the modified wood is calculated from the following equation.

$$WPG=[(Wt-Wu)/Wu]\times 100\%$$

(2) Percent leaching of silicone resin

A 300-ml beaker was charged with 250 ml of deionized water at 20°–24° C. which was stirred by a magnetic stirrer at 160±3 rpm. The modified wood piece was admitted into the water and taken out after 4 hours of stirring. The wood piece was dried and measured for oven dry weight (Wt'). The weight gain (WPG') of the modified wood after 4 hours of the leaching test was calculated. The percent leaching of silicone resin is calculated from the following equation.

$$Leaching=[(WPG-WPG')/WPG]\times 100\%$$

(3) Residual weight by thermogravimetric analysis

Using a thermogravimetric tester, a TG curve representative of a weight change of the modified wood during heating was plotted. The weight change is expressed on the basis of a weight of 100% at 170° C. In the case of untreated wood, for example, flaming combustion corresponds to an abrupt weight loss near 350° C. and glowing combustion occurs in a temperature range of 370° to 550° C. A residual weight (%) by thermogravimetric analysis corresponds to a residual weight calculated at the end of flaming combustion.

EXAMPLE 2

A 1-liter flask was charged with 123 grams (0.9 mol) of methyltrimethoxylsilane and 10.4 grams (0.1 mol) of trimethyl borate. With stirring at 30° C., 15 grams of water was added dropwisely to the flask for reaction to take place. The reaction solution was ripened for one hour at 60° C., obtaining a 65% methanol solution of an oligomer. The solution was diluted with methanol to form a 10% methanol solution of the oligomer. This oligomer had an average compositional formula:

$$(CH_3SiO_{3/2})_{0.9}(BO_{3/2})_{0.1}$$

and an average degree of polymerization of about 6 and was terminated with a methoxyl group and a hydroxyl group.

Next, using the oligomer solution, wood was modified as in Example 1. The modified wood piece had a weight gain of 10.8%. In the leaching test, 6.8% by weight of the silicone resin was leached out. Upon thermogravimetric analysis, the modified wood piece had a residual weight after flaming combustion of 64% independent of whether or not it had been subject to the leaching test.

EXAMPLE 3

A 1-liter flask was charged with 102 grams (0.75 mol) of methyltrimethoxylsilane and 21 grams (0.25 mol) of phosphorous acid. The solution was stirred for 5 hours at 30° C. in a nitrogen atmosphere for reaction to take place, obtaining a 80% methanol solution of an oligomer. The solution was diluted with methanol to form a 10% methanol solution of the oligomer. This oligomer had an average compositional formula:

$$(CH_3SiO_{3/2})_{0.75}(PO_{3/2})_{0.25}$$

and an average degree of polymerization of about 4 and was terminated with a methoxyl group.

Using the oligomer solution, wood was then modified as in Example 1. The modified wood piece had a weight gain of 11.1%. In the leaching test, 9.2% by weight of the silicone resin was leached out. Upon thermogravimetric analysis, the modified wood piece had a residual weight after flaming combustion of 63% when it had been subject to the leaching test and 65% without the leaching test.

EXAMPLE 4

A 1-liter flask was charged with 61.2 grams (0.45 mol) of methyltrimethoxylsilane, 54.0 grams (0.45 mol) of dimethyldimethoxylsilane, and 3.1 grams (0.05 mol) of boric acid. With stirring at 30° C., 13.7 grams of a 30% phosphorous acid aqueous solution (0.05 mol of phosphorous acid) was added dropwisely to the flask for reaction to take place. The reaction solution was ripened for one hour at 60° C., obtaining a 70% methanol solution of an oligomer. This solution had an initial viscosity of 2 centistokes and had little thickening after storage in a sealed condition at 40° C. for 3 months. The solution was diluted with methanol to form a 10% methanol solution of the oligomer. This oligomer had an average compositional formula:

$[CH_3SiO_{3/2}]_{0.45}[(CH_3)_2SiO]_{0.45}[PO_{3/2}]_{0.05}[BO_{3/2}]_{0.05}$ and an average degree of polymerization of about 6 and was terminated with a methoxyl group and a hydroxyl group.

Separately, a veneer piece of pacific hemlock sap wood (50 mm×100 mm×1 mm) was conditioned to a water content of 25% by Soxhlet extraction with acetone for 24 hours and then with water for 24 hours. The veneer piece was dipped in the methanol solution of the oligomer at room temperature whereupon impregnation was effected under a vacuum of 15 mm Hg for 3 days. Thereafter, the veneer piece was heat treated for 24 hours at 65° C. and then for 24 hours at 105° C. for ripening the gel within the test piece, obtaining a modified wood piece. The modified wood piece had a weight gain of 13.3% due to the incorporation of a silicone resin containing phosphorus and boron oxides. A 300-ml beaker was charged with 250 ml of distilled water. While stirring water at 160±3 rpm, the modified wood piece was admitted into the beaker. Stirring was continued for 4 hours. The modified wood piece was examined for weight change, finding that 3% by weight of the silicone resin was leached out. The piece was tested by thermo-gravimetric analysis to find a residual weight after flaming combustion of 65.8%. Another modified wood piece which had not been subject to the leaching test had a residual weight of 66.0%. An untreated wood piece (control) had a residual weight of 27%.

EXAMPLE 5

A 1-liter flask was charged with 121.04 grams (0.89 mol) of methyltrimethoxylsilane, 1.04 grams (0.01 mol) of trimethylmethoxylsilane, and 3.1 grams (0.05 mol) of boric acid. With stirring at 30° C., 13.6 grams of a 30% phosphorous acid aqueous solution (0.05 mol of phosphorous acid) was added dropwisely to the flask for reaction to take place. The reaction solution was ripened for one hour at 60° C., obtaining a 70% methanol solution of an oligomer. This solution had an initial viscosity of 2 centistokes and had little thickening after storage in a sealed condition at 40° C. for 3 months. The solution was diluted with methanol to form a 10% methanol solution of the oligomer. This oligomer had an average compositional formula:

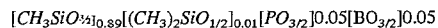

$[CH_3SiO_{1/2}]_{0.89}[(CH_3)_2SiO_{1/2}]_{0.01}[PO_{3/2}]0.05[BO_{3/2}]0.05$ and an average degree of polymerization of about 6 and was terminated with a methoxyl group and a hydroxyl group.

Using the oligomer solution, wood was then modified as in Example 4. The modified wood piece had a weight gain of 11.1%. In the leaching test, 6% by weight of the silicone resin was leached out. Upon thermogravimetric analysis, the modified wood piece had a residual weight after flaming combustion of 65.5% when it had been subject to the leaching test and 66.0% without the leaching test.

EXAMPLE 6

A 1-liter flask was charged with 81.6 grams (0.60 mol) of methyltrimethoxylsilane, 36.0 grams (0.30 mol) of dimethyldimethoxylsilane, and 10.4 grams (0.1 mol) of trimethyl borate. With stirring at 30° C., 15 grams of water was added dropwisely to the flask for reaction to take place. The reaction solution was ripened for one hour at 60° C., obtaining a 65% methanol solution of an oligomer. This solution had an initial viscosity of 2 centistokes and had little thickening after storage in a sealed condition at 40° C. for 3 months. The solution was diluted with methanol to form a 10% methanol solution of the oligomer. This oligomer had an average compositional formula:

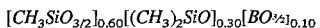

$[CH_3SiO_{3/2}]_{0.60}[(CH_3)_2SiO]_{0.30}[BO_{1/2}]_{0.10}$ and an average degree of polymerization of about 6 and was terminated with a methoxyl group and a hydroxyl group.

Using the oligomer solution, wood was then modified as in Example 4. The modified wood piece had a weight gain of 11.0%. In the leaching test, 3.5% by weight of the silicone resin was leached out. Upon thermogravimetric analysis, the modified wood piece had a residual weight after flaming combustion of 63.9% when it had been subject to the leaching test and 64.0% without the leaching test.

EXAMPLE 7

A 1-liter flask was charged with 68.0 grams (0.50 mol) of methyltrimethoxylsilane, 30.0 grams (0.25 mol) of dimethyldimethoxylsilane, and 31.0 grams (0.25 mol) of trimethyl phosphite. With stirring at 30° C., 15 grams of water was added dropwisely to the flask for reaction to take place. The reaction solution was ripened for one hour at 60° C., obtaining a 60% methanol solution of an oligomer. This solution had an initial viscosity of 2 centistokes and little thickened after storage in a sealed condition at 40° C. for 3 months. The solution was diluted with methanol to form a 10% methanol solution of the oligomer. This oligomer had an average compositional formula:

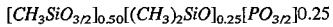

$[CH_3SiO_{3/2}]_{0.50}[(CH_3)_2SiO]_{0.25}[PO_{3/2}]0.25$ and an average degree of polymerization of about 6 and was terminated with a methoxyl group and a hydroxyl group.

Using the oligomer solution, wood was then modified as in Example 4. The modified wood piece had a weight gain of 11.3%. In the leaching test, 5% by weight of the silicone resin was leached out. Upon thermogravimetric analysis, the modified wood piece had a residual weight after flaming combustion of 64.5% when it had been subject to the leaching test and 65.0% without the leaching test.

COMPARATIVE EXAMPLE 1

A veneer piece of western hemlock sap wood (50 mm×100 mm×1 mm) was conditioned to a moisture content of 25% by Soxhlet extraction with acetone for 24 hours and then with water for 24 hours. The veneer piece was dipped in a reaction solution consisting of trimethyl phosphite, ethanol, and acetic acid in a molar ratio of 1:1:0.01 under vacuum at room temperature for 3 days. Thereafter, the veneer piece was heat treated for 24 hours at 65° C. and then for 24 hours at 105° C. for ripening the gel, obtaining an inorganic substance-incorporated wood piece. The modified wood piece had a weight gain of 9.4% due to the incorporation of a metal oxide.

A 300-ml beaker was charged with 250 ml of distilled water. While stirring water at 160±3 rpm, the modified wood piece was admitted into the beaker. Stirring was continued for 4 hours. The modified wood piece was examined for weight change, finding that 76% by weight of the metal oxide was leached out. The piece was tested by thermogravimetric analysis to find a residual weight after flaming combustion of 55%. Another modified wood piece which had not been subject to the leaching test had a residual weight of 67%.

According to the invention, wood is treated with safe methylsiloxane oligomers. The methylsilicone resins thus incorporated and fixed within wood are not leached out in water and remain stable so that the modified wood maintains flame retardance for a long period of time even upon exposure to rain and dew. The modified wood is given not only water repellence, but also decay resistance and dimensional stability. By modifying wood by the method of the invention, flame retardant wood members which can be used in open areas and as building interior and exterior members can be manufactured on a large scale.

Japanese Patent Application No. 150821/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing modified wood, comprising the steps of impregnating wood with a methylsiloxane oligomer containing phosphorus and/or boron and curing the oligomer, said methylsiloxane oligomer being of the following average compositional formula (1) or (2):

(1) $(CH_3SiO_{3/2})_m(MO_{3/2})_n$ (2) $[CH_3SiO_{1/2}]_x[(CH_3)_aSiO_{(4-a)/2}]_y[MO_{3/2}]_z$ wherein M is at least one of P, PO and B, letters m and n are positive numbers, and an average ratio of m:n is from 99:1 to 50:50, and m+n=1, x, y, and z are positive numbers, an average ratio of (x+y):z is from 99:1 to 50:50, an average ratio of x:y is from 99:1 to 50:50, and x+y+z=1, and a is equal to 2 or 3, and having a hydroxyl group and/or an alkoxyl group of 1 to 4 carbon atoms at a terminal end.

2. The method of claim 1 wherein the impregnating step uses a solution of the methylsiloxane oligomer in a solvent.

3. The method of claim 1 wherein the step of curing the oligomer is carried out by heating the impregnated wood.

4. The method of claim 1, wherein the methylsiloxane oligomer is of the formula (2).

5. The method of claim 1, wherein, in formula (1), the average molar ratio of m:n is from 95:5 to 70:30 and, in formula (2), the average molar ratio of (x+y):z is from 95:5 to 70:30.

6. The method of claim 1, wherein the methylsiloxane oligomer has an average degree of polymerization of 2 to 50.

7. The method of claim 3, wherein the heating is at a temperature of 50° to 110° C.

* * * * *